(12) United States Patent
Singleton

(10) Patent No.: US 9,061,575 B2
(45) Date of Patent: Jun. 23, 2015

(54) VEHICLE WINDSHIELD, WIPER-BAY AND WINDOW EXTERNAL, REUSABLE COVER

(71) Applicant: Ogle Ridout Singleton, Richmond, VA (US)

(72) Inventor: Ogle Ridout Singleton, Richmond, VA (US)

(*) Notice: Subject to any disclaimer, the term of this patent is extended or adjusted under 35 U.S.C. 154(b) by 0 days.

(21) Appl. No.: 14/144,173

(22) Filed: Dec. 30, 2013

(65) Prior Publication Data

US 2014/0182795 A1    Jul. 3, 2014

Related U.S. Application Data

(60) Provisional application No. 61/848,364, filed on Jan. 3, 2013.

(51) Int. Cl.
*B60J 11/08*    (2006.01)

(52) U.S. Cl.
CPC ........................... *B60J 11/08* (2013.01)

(58) Field of Classification Search
CPC ...... B32B 15/016; B32B 15/017; B04B 5/00; B04B 9/14; B21B 3/00; B22D 11/064; B22F 3/1266; B60J 11/08; B62H 7/00; B62K 9/00
USPC .......... 150/168, 370.21; 296/95.1, 97.7, 97.8, 296/84.1; 16/370.21
See application file for complete search history.

(56) References Cited

U.S. PATENT DOCUMENTS

| | | | | |
|---|---|---|---|---|
| 3,046,048 | A * | 7/1962 | Cheney | 296/95.1 |
| 5,123,468 | A * | 6/1992 | Mater, Jr. | 150/168 |
| 5,356,191 | A * | 10/1994 | Sheehan | 296/95.1 |
| 6,076,577 | A * | 6/2000 | Ontaneda | 150/168 |
| 7,823,953 | B2 * | 11/2010 | Haas | 296/95.1 |
| 2009/0301671 | A1* | 12/2009 | Locklear | 160/370.21 |
| 2010/0200180 | A1* | 8/2010 | Lien | 160/370.21 |

* cited by examiner

*Primary Examiner* — Glenn Dayoan
*Assistant Examiner* — Sunsurraye Westbrook

(57) ABSTRACT

An improved, reusable, protective, reflective, weather resistant cover for a vehicle windshield-wiper-bay region and also for front-side windows and for the rear window region is disclosed. The cover is easy and fast to deploy, the operator is not required to reenter the vehicle for deployment and no cover element extends inside the vehicle. Permanent magnets and/or hook and loop strips are used to removably affix the cover. No permanently attached fastener elements are observable from within or without the closed vehicle. The cover effectively reflects the sun's rays reducing internal heating and material degradation and eases removal of frost, sleet or snow from covered regions.

13 Claims, 7 Drawing Sheets

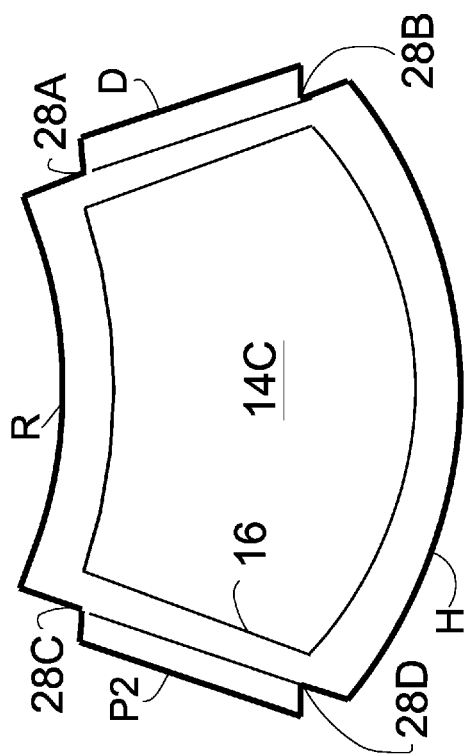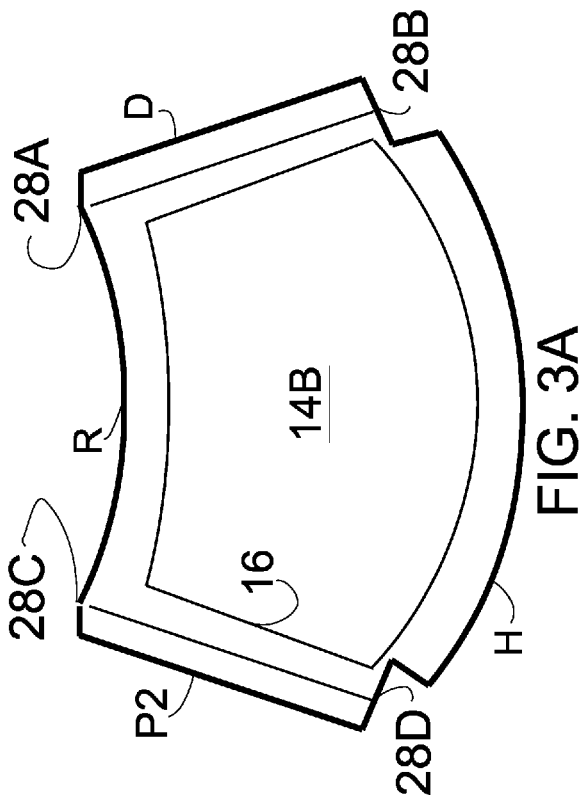

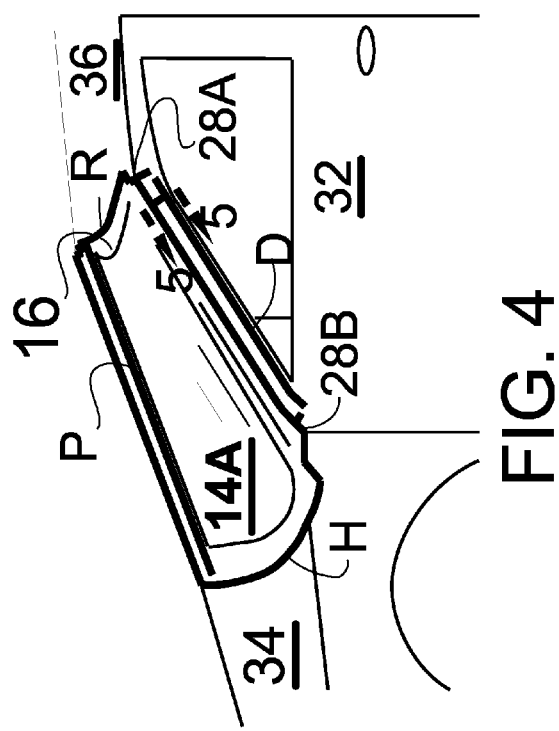
FIG. 5A
FIG. 5B
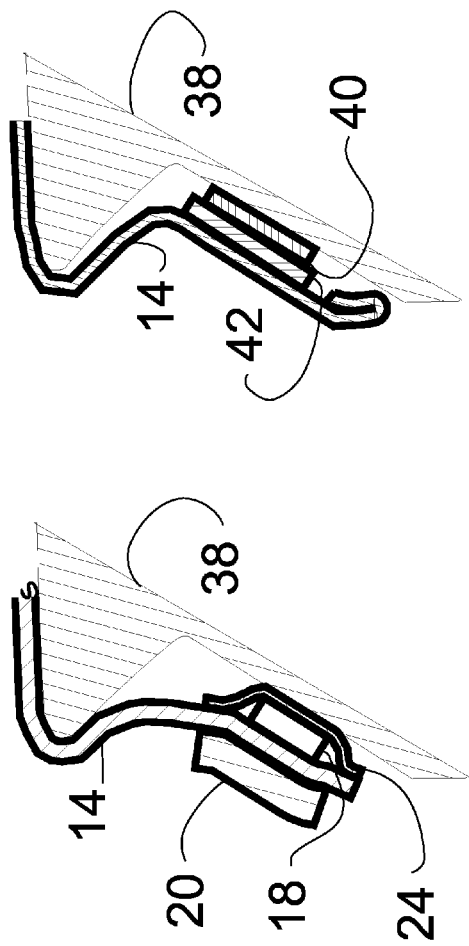
FIG. 4

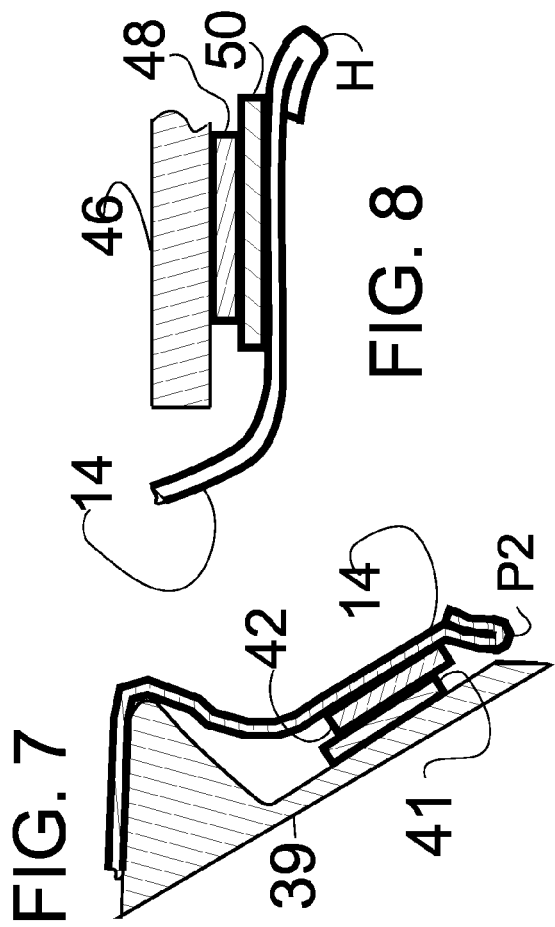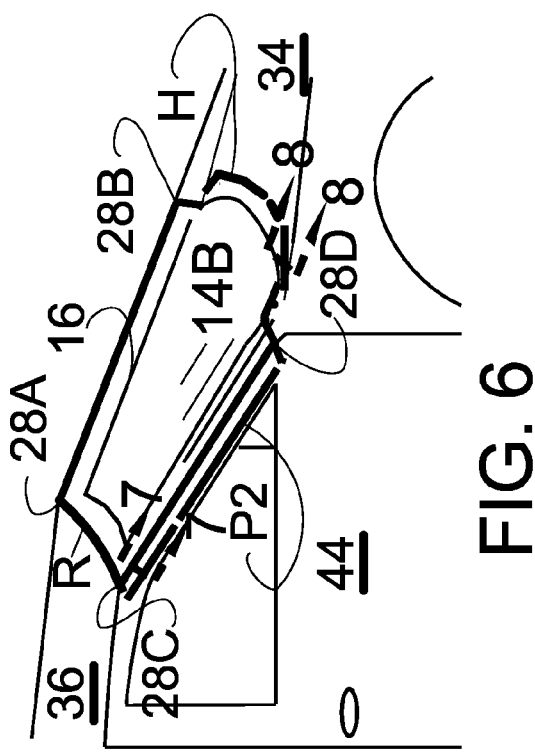

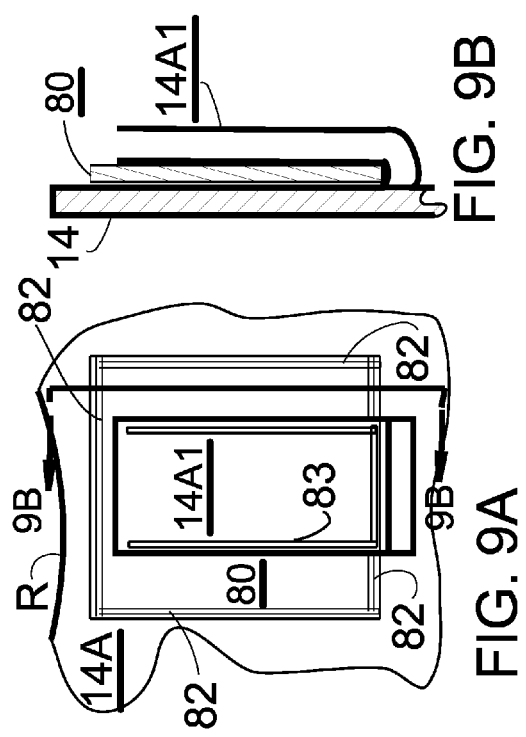
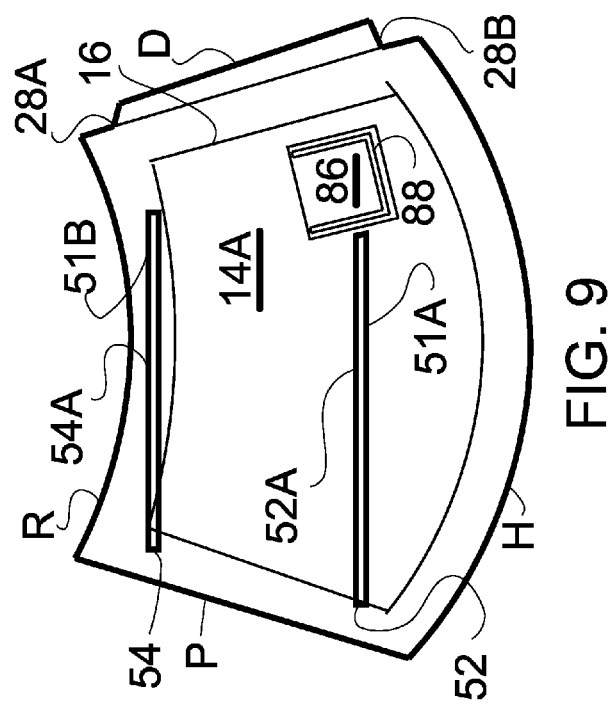

VEHICLE WINDSHIELD, WIPER-BAY AND WINDOW EXTERNAL, REUSABLE COVER

CROSS-REFERENCE TO RELATED APPLICATIONS

I claim priority from provisional patent application number U.S. 61/848,364 having a filing date of Jan. 3, 2013.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON COMPACT DISC

Not Applicable

BACKGROUND OF THE INVENTION

1. Field of the Invention

This invention relates to a protective, external, reflective cover for the windshield region of a vehicle. Variants can protect front windows and rear windows of a vehicle. Cover deployment is quick and, when deployed, theft is deterred.

2. Description of Related Art a. Internal Sunshields:

A large amount of the prior art is devoted to sunshields that are internal to the vehicle. Such devices are not really effective for reducing heat build-up inside a closed vehicle and, obviously, provide absolutely no protection from frost, sleet, or snow The principal, utilitarian object of the present invention is totally differentiated from the above art because it comprises an external, reflective, weather resistant, reusable cover which effectively reduces heat build-up inside a closed, stationary vehicle from the sun's rays and also protects both the windshield and the windshield wipers in the windshield wiper bay from accumulations of frost, sleet or snow and, when deployed, has theft deterrent properties. A further, differentiating, utilitarian objective of the instant invention is that the cover may be deployed and removed simply, easily and speedily. Modifications of the principal objective include external covers of other portions of a stationary vehicle having most of the above differentiating properties.

b. Complex Covers:

A small group of external, windshield sunshields are elaborate and involve complex mechanisms as exemplified by Frotz, U.S. Pat. No. 8,240,739, Owen, U.S. Pat. No. 5,615,924 and also Robbins, U.S. Pat. No. 7,931,325 B2 which is less complex but requires two, flexible wire frames to support the fabric cover and uses a cut resistant wire reinforced belt and buckle which must be secured within the vehicle for theft deterrence. Such inventions are far removed from the "keep it simple" utilitarian concept of the present invention.

c. Windshield Only:

There have been many different types of vehicle, exterior, windshield covers disclosed in U.S. patents and for sale to the general public. Many of those devices are windshield only covers as exemplified by the "SUN-SHADE COVERS" offered by EmpireCovers.com. As such they provide no protection for the windshield wiper blades from degradation by ultraviolet rays from the sun nor is protection provided from accumulations of debris or leaves or snow from blocking the wipers or cabin air vents which are many times located in the wiper bay. The instant invention is distinct in that in its primary function it provides a covering of the windshield wiper bay as well as the windshield. Additional distinction is discussed in subsection "h" below.

d. Exterior Mounting Points and Suction Cups:

One major group of exterior windshield covers require installation of exterior mounting points to be installed permanently on the vehicle as exemplified by Dillow, U.S. Pat. No. 2,331,600 or Bliss U.S. Pat. No. 3,140,115. Installation of permanent mounting points observable, either externally or internally, is extremely undesirable for most vehicle owners and is avoided in the present invention. Further, an exterior cover which does not require a door or other closure member to be opened to allow removal of the cover such as Shahrokh U.S. Pat. No. 4,952,007 does not offer theft deterrence as well as being a whole vehicle cover and time consuming to install and is thus distinct from the present invention.

Another major group of exterior windshield covers require the use of separately installed mounting points such as suction cups to be used each time the cover is installed as in Osborn U.S. Pat. No. 2,599,066 or Ealey and Onsley U.S. Pat. No. 3,184,264. Keeping track of suction cups and installing them prior to cover installation is undesirable as well as time consuming and is avoided in the present invention.

e. Elastic Strap Fastenings:

A further major group of exterior windshield covers is secured to the vehicle by elastic straps. Elastic straps are not used in the instant invention. Elastic materials in general do not hold up well under external weather exposure which reduces the utility of covers having a portion of their elastic strapping externally exposed.

In the art two or more, usually four, elastic straps are usually hooked together in pairs internally to the vehicle, or hooked to existing interior points such as visor posts and exterior points such as door hinges as in Omerly, Jr. U.S. Pat. No. 2,065,242 or hooked to exterior points such as fenders as in Wyeth U.S. Pat. No. 2,437,845 or Shahrokh U.S. Pat. No. 4,954,007.

A cover mounted using all exterior mounting points will not deter theft and mounting is surprisingly difficult for one person to accomplish. If the elastic straps are hooked within the vehicle, the procedure is probably simplest with Omerly; however he requires hooking to a visor and hinge on one side, deploying the cover fully and then opening the passenger door, and partially reentering the vehicle to hook the final strap. The reentering of the vehicle takes more time and effort than is desirable if a faster means is available and most current vehicles do not have an exterior hinge so that hooking to an enclosed hinge more difficult. The present invention provides the greater utility of simple and fast means for mounting an exterior vehicle windshield and wiper bay cover in which in most cases the passenger's side door need not be opened, and, if opening is required, there is no need to partially reenter the vehicle and bend down to fasten two hooks.

Hogan U.S. Pat. No. 8,132,603 B2 uses handles and both a magnetic strip and Velcro tips on elastic straps as elements of his windshield cover and protector. Hogan's magnetic strip secures the top edge of his cover to the roof. His elastic straps require fastening inside the vehicle and outside the vehicle suffering even more disadvantageous requirements than previous inventions using internal strap fastening. Hogan makes no attempt to cover the windshield wiper well; a serious omission.

Fischer U.S. Pat. No. 4,209,197 has some elements in common with the instant invention but is distinct in that it covers the whole cabin region, requires connection of the two halves down the center of the roof (depending on the operator's stature perhaps difficult or impossible) and both the rear window and windshield. Further, Fischer then secures his cover with additional elastic straps connected externally; hence not offering any theft deterrence except requiring significant time to remove (as well as install) his cover. Thus, Fischer is far from the quick, easy deployment of the instant invention.

Lundberg U.S. Pat. No. 5,037,156 has an exterior windshield cover with wings and straps placed inside doorframes. Each wing's straps have attached one cord which is long enough to keep the operator's hand from the doorway during closure. Lundberg's method requires great if not impossible operator dexterity to keep his cover taut during the last door closure when air is rushing out of the vehicle acts to raise the cover from the doorway and, at the same time, the effective length of the wing cord for holding the cover taut is rapidly changing.

f. Magnetic Holding Force:

Another group of exterior covers uses magnetic force either totally or in part to secure a vehicle cover to a vehicle. Flaherty U.S. Pat. No. 2,639,751 places a strip of "magnetic material" on the edge region of his cover and secures a row of spaced permanent magnets to the article (vehicle) to be covered. As noted above, attachment of observable mounting points such as the permanent magnets to a vehicle is undesirable.

Wytovich, U.S. Pat. No. 3,042,111 uses magnets attached to the peripheral edge of his cover which hold his cover to the exterior of a vehicle plus additional lines attached to one or more side view exterior mirrors. There is no effective theft deterrence for the exterior cover of this invention. The lack of theft deterrence is also a problem with Cheney U.S. Pat. No. 3,046,048 which is held to the vehicle with peripheral magnets as well as hooks engaging roof gutters (which have been generally eliminated in more recent vehicle production). Cheney has his operator fasten first one gutter hook and then go to the other side to engage and tension the second top hook (col. 2 & 3 lines 63 to 2). Then the lower edge may be properly positioned (on both sides) so that the magnets secure the edges of the sheet to the metallic surfaces of the vehicle (col. 3 lines 2 to 7). The operator must engage the hook on his side, visit the passenger side and then return to the driver's side for the final securing of the cover which is undesirable in terms of both user time and effort expended such that utility is questioned.

Lau, U.S. Pat. No. 7,673,924 B1 uses magnets to hold her windshield wiper well cover to the hood of a vehicle; the well cover being part of her windshield cover which is held against the windshield by attached wings with elastic loops both of which are inserted inside the vehicle through the front doors with the loops attached to the visor posts. Lau's loop attachment requires that the driver and passenger doors be opened and that the operator enter or reach inside the vehicle to secure the loop to the visor post. The operability of a flexible cover being held against the windshield both top and bottom by her arrangement is in doubt.

Johnson and Johnson, U.S. Pat. No. 3,910,330, disclose magnetic inlays in a roof (not window) cover used as the primary means to hold their cover to the roof of a vehicle. Thus the purpose of the invention is distinct from that of the instant invention. They also require internally fastened elastic straps to deter theft of the cover.

Norman U.S. Pat. No. 3,763,908 uses magnets attached to both the cover itself and to the ends of straps to hold a whole vehicle cover to the exterior of the vehicle. The cover is provided with means to permit air space between the cover and the vehicle body. As distinct from the instant invention there is no theft deterrence in the Norman cover attachment means.

Thayer U.S. Pat. No. 6,662,839 B1 discloses a cover for a windshield and the two side mirrors. The top edge of his cover is held to the vehicle roof by one or more magnets and the bottom of his cover is held by wraps around the side mirror support arms. The mirrors are also provided with attached covers. Thayer's cover provides no theft deterrence. Other than the commonality of magnet(s) used to secure the top edge of the cover, Theyer is totally distinct from the instant invention.

g. Difficulty in Providing a Suitably Taut Cover:

A group of prior art patents, exemplified in the following discussion, does not provide an effective solution to the important problem of keeping their exterior protective covers taut when the last door of an otherwise closed vehicle is shut. When the last door is shut, unless closed impractically slowly, there is an out rush of air around the door edges. That out rush of air will displace in an outwardly direction any cover hanging in the doorway not either secured or otherwise held to the vehicle frame A-pillar.

"SUN-SHADE COVERS" offered by EmpireCovers.com has small wings with a compressible substance encased in a portion of the wing-end hems. The wings are to be secured within upper closure regions of the two front doors. Such covers are significantly differentiated from the instant invention by the fact that there is no attachment means to secure the wing ends during closure of the front door; hence the cover cannot be tautly secured to a closed vehicle. Much the same reasoning applies to Hooper et al U.S. Pat. No. 4,635,993 which uses a cover with padded wings which are designed to be enclosed within the door jams on each side of the windshield. With no specific means to secure these wings to the A-pillar the rush of air on last door closure is sure to result in a cover that is far from taut to the windshield.

Wood U.S. Pat. No. 7,059,650 B1 discloses four embodiments of a disposable windshield cover which may also cover other windows and doors. His cover is not reusable a basic distinction. His cover is held in place by enclosing wings, tabs or similar sections in door closures, tucked under windshield wipers or tucked under the hood. The final door closure of a closed vehicle will disrupt the placement of the cover portion meant to be secured in the closure by the outward rushing air. Tucked under wipers a cover does not protect them, Tucked under the hood under breezy conditions the shape of modern windshields creates an airfoil condition producing a low pressure region under the cover which under certain conditions will cause the tucked region to become untucked and flap reducing the desired protection.

Any cover whose edge is displaced by the air rush from the final door closure will obviously not act to seal the covered region from wind driven rain, sleet or snow—a primary functional purpose of the cover. Such a cover will also tend to flap in a wind of more than a gentle breeze thus being subject to early fatigue stress failure.

A workaround to avoid the air-rush problem is to open a rear door and make that door the final closure; however, requiring such an extra operation reduces utility.

Haas U.S. Pat. No. 7,823,953 B2 has some elements in common with the instant invention. Haas's cover is "opaque, reflective, snow- and ice-repellant material that shields windshields, windshield wipers and air intake manifolds of vehicles . . . and also prevents the sun's rays from penetrating the interior of vehicles through windshields." all objects of the current invention. However, Haas is distinct and has specific elements less utilitarian than the instant invention.

Specifically, Haas's cover uses more material requiring (claim 1) "tapered widths of about one foot at each end to wrap around the door frame" whereas the instant invention cover ends within the door jam or at the extent of the passenger side A-pillar; thus using about 0.6-meters (2-feet) less material per windshield cover.

Haas requires a plurality of rods to span from the roof across the face of the windshield and wiper well to the hood (col. 4 lines 14 to 20) creating a covered open space between the roof and hood. The instant invention can use two rods; however the rods are external, horizontal versus Haas's vertical and underside. The two rods of the present invention have utility because they are used to help quickly position the cover across the windshield.

Combined with the tapered end method of securing his cover (described col. 4 lines 49 to 57) the cover will not be taut because the air rushing out as the final door is closed will of necessity tend to push the tapered end out of the vehicle unless, for example, a rear door has been opened and is later closed.

Much the same reasoning differentiates Haas's rear window cover from that of the instant invention.

Langley U.S. Pat. No. 6,513,853 B2 provides pocket covers for the doors adjacent to the windshield. His cover also extends to cover the cowl or windshield wiper well. Thickened flanges "adapted to lie between an upper portion of a front door and the adjacent cab portion of an automobile when a front door is in a closed position (or) . . . . To lie entrapped within an automobile passenger compartment." (column 3, lines 13 to 16; 18 & 19).

Langley's invention has no means to maintain a taut windshield cover which is desirable for effective windshield protection. His method of securing his cover is totally distinct from the instant invention. Ontaneda U.S. Pat. No. 6,076,577 is an earlier discloser of top end pocket covers for doors for primary attachment of his cover. He also discloses the use of hooks or straps or magnets to secure the lower far corners of his cover (column 3, lines 1 to 11). Although his cover can be made taut if specifically dimensioned for a particular windshield and door combination when the door is opened enough to affix the cover, the cover will not be taut when the doors are in the closed position unless the cover is of elasticized material which may well lack durability. Pockets comprise a securing methodology distinct from the instant invention.

BRIEF SUMMARY OF THE INVENTION

The object of my invention is to provide an exterior protective, reflective, reusable cover for a vehicle's windshield and wiper-bay well, a variant to include a cover for one or more of a vehicle's front windows and an additional cover of like properties for a vehicle's rear window. Another object is to provide a windshield cover which may be deployed simply and quickly, has theft deterrence, and in the prime embodiment, may be deployed by the operator from the necessarily open driver's side door and secured by the closing and locking of that one door. In a second embodiment the operator is required to open the passenger's side door to secure the edge region of my cover within that door's closure region.

The door-edge regions of the cover are held in the prime embodiment with magnetic force to ferromagnetic A-pillars of the vehicle body. Magnetic force may also be employed to hold the roof and hood edge regions of the cover to those ferromagnetic body parts. When the hood is not ferromagnetic, the cover may be secured to the underside of the hood by hook and loop mating strips. Hook and loop fastening is used to secure the door edge regions within the front door closure regions when the A-pillar body is not ferromagnetic or when the A-pillar body region is surmounted by gasket material. Theft deterrence is obtained by incorporating compressible material in at least the driver's side edge region, held within the door closure, and is sufficient in bulk to prevent cover pull-out from the door closure.

In all embodiments the operator needs never to even partially reenter the vehicle to deploy my cover which speeds and simplifies deployment. During deployment the cover is secured to the A-pillar of the vehicle thus the cover is not displaced by out rushing air when the door of the otherwise closed vehicle cabin is closed. The cover of my invention is further differentiated from the art by being dimensioned for a given vehicle body style which enhances the effective use of the reflective exterior of the cover for slogans, messages or advertising providing improved merchantability.

BRIEF DESCRIPTION OF THE SEVERAL VIEWS OF THE DRAWINGS

The drawings illustrate preferred embodiments of the present invention according to the best presently devised practical application of the principles thereof, and in which:

FIG. 3A is a plan view of my second preferred embodiment of an external vehicle protective windshield cover as configured for a left hand drive vehicle.

FIG. 3B shows a modification to my second preferred embodiment of the external vehicle protective windshield cover laid out flat and configured for a left hand drive vehicle.

FIG. 4 is a partial perspective of the driver's side of a left hand drive vehicle with my first preferred embodiment of my cover shown in its deployed position.

FIG. 5A shows a fragmentary cross sectional detail of a peripheral region of the first preferred embodiment of my external, vehicle, protective, windshield cover attached by magnetic force to a fragmentary cross section of the A-pillar of the driver side of a vehicle within the door closure region; door not yet closed.

FIG. 5B shows a fragmentary cross sectional detail of a peripheral region of the external vehicle protective windshield cover to which is attached a hook or loop strip which is joined to a mating hook or loop strip which is attached to the A-pillar within the door closure region of the driver's side of a vehicle; door not yet closed.

FIG. 6 is a partial perspective of the passenger's side of a left hand drive vehicle with my second preferred embodiment of my cover shown in its deployed position.

FIG. 7 shows a fragmentary cross sectional detail of a peripheral region of my second preferred embodiment of my cover to which is attached a hook or loop strip which is joined to a mating hook or loop strip which is attached to the A-pillar within the door closure region of the passenger's side of a vehicle; door not yet closed.

FIG. 8 shows a fragmentary cross sectional detail of a peripheral region of my second preferred embodiment of my external, vehicle, protective, windshield cover to which is attached a hook or loop strip which is joined to a mating hook or loop strip which is attached to the underside of the rear edge region of the closed vehicle hood.

FIG. 9 shows the first preferred embodiment of my cover as designed for a left hand drive vehicle shown laid out flat with two, partially attached, external, flexible rods. FIG. 9 also shows a transparent pocket on the cover exterior near the driver's lower side which pocket will permit the receipt of a missive such as a "parking ticket", the pocket is formed between elements 86 and 14A.

FIG. 9A shows a fragment of the underside of my protective cover and the construction details of a permit pocket the variable contents of which are visible from the front of my cover and the contents of which are also protected by my external cover.

FIG. 9B shows a partial cross section of my cover and the added transparent pocket cover; the pocket is formed between elements 80 and 14A1.

DETAILED DESCRIPTION OF THE INVENTION

Figure 2A:
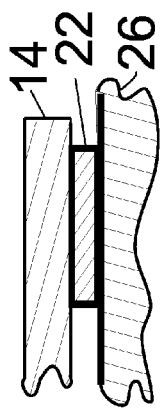
FIG. 2A shows a fragmentary cross sectional detail of a peripheral hem of my external vehicle protective windshield cover which hem secures the position of a shown magnet.

The novel attachment means used for my external protective covers requires that my covers are not a "one size fits all" but requires that the covers be dimensioned to a particular vehicle body size within about 2 to 3-cm. (1-in.). Further the mode of gasketing around the windshield and A-pillar will determine which of my embodiments can function properly. While the preceding customization adds to the complexity of manufacture, it also creates a novel and specific marketing opportunities for my covers to be printed on the exterior surface with specific designs or slogans with the foreknowledge as to the vehicle type for which the cover will be used enhancing marketability of my novel covers.

Some embodiments of my covers utilize a plurality of mating pairs of hook and loop strips for attachment of a cover to a vehicle. Obviously to secure attachment it is necessary for, say, a hook faced strip to be bonded to the cover which then requires a loop faced strip to be bonded to the vehicle. It is also obvious that the active faces must be arranged such that the faces can be pressed together for engagement. The full surface mating area need not be bonded but only a substantial area of each mating pair. I prefer requiring a specific layout of strips bonded to a cover and providing a template for the locating of the mating strips to be attached to the intended vehicle. Commercially available, adhesive backed, nylon hook or loop strip in widths of about 19 to 26-mm (¾ to 1-in.) and strip lengths of about 3 to 10-cm (1 to 4-in.) are preferred for use to attach to the vehicle. It is preferred to use "sew on" strips for attachment to my cover. To provide an allowance to enable a taut fit for a cover to a vehicle a mating strip pair may be of different width strips or at angles one to another. Essential to my invention is that the placement of the vehicle body-attached, hook or loop strips is essentially unobservable from either the exterior or the interior of the vehicle since the body-attached strips are located within door or hatch closures or under a hood.

Some embodiments of my covers use permanent magnets to provide a magnetic force-field for holding the cover to a ferromagnetic vehicle body. Although magnets can be attached adhesively to a cover, adhesives tend to degrade when exposed for long periods to variable weather conditions which can also degrade magnet materials even when magnets are protectively plated. Although presenting a magnet surface as close to a ferromagnetic vehicle body as possible maximizes holding force, which is desirable, individual permanent magnets are usually hard and their direct contact with vehicle finish poses an undesirable scratching or dinging hazard. Sometimes magnets are coated with a plastic which can be helpful; however, I prefer to encapsulate magnets by incorporating them within a hem around the edge of a cover which protects both the magnet and the vehicle finish as well as ensuring stable attachment of the magnet to the cover. Because magnetic holding force decreases with distance about as a power function, i.e. very rapidly at first, it is essential that an encapsulating non-magnetic material over the magnet face destined to be attracted to a vehicle body be as thin as practical yet adequately retain the magnet. A non-magnetic encapsulating material thickness of about 1-mm (0.04-in.) is about the maximum to be economically practical in terms of current permanent magnet cost-force properties and less than about 0.25-mm (0.01-in.) thickness is preferred for separation of a permanent magnet from a normally finished vehicle surface.

A major advantage of my novel covers is that deployment of the cover is easy and fast making use more desirable than the prior art covers. A magnetically held cover can be partially deployed by the driver initially emerging from his open doorway, continuing normal actions that door is closed and locked securing the cover within the closure, the driver then completes deployment from the passenger's side of the vehicle without the need of opening a door. Prototype covers of my invention have been easily deployed in less than one minute.

Magnetic tapes can be attached to the vehicle side of the periphery region of my covers to hold a cover to a ferromagnetic vehicle body. Magnetic tapes, preferably commercially available tapes about 10 to 26-mm (½ to 1-in.), hold satisfactorily in less than about gale force winds particularly when the magnetic tape is smoothly in contact with a vehicle body. Magnetic tapes tend to loose flexibility in cold weather;

hence, magnetic tapes may be less desirable for holding a cover in cold weather against a sharply curved, exterior surface of a vehicle.

The material used for my cover can be any one of many known to the arts of vehicle covers, out-door use tarpaulins, shelters and even emergency, personal covers. A superior cover material will usually be a composite material. I prefer a flexible composite material such as polyethylene, fluoride containing films or Mylar films any such film reinforced with a mesh of threads preferably of nylon. The cover should be metalized with a reflective metal such as aluminum to preferably more than 80% coverage for reflectivity either on the exterior surface or under a transparent exterior surface and the exterior surface requires good weather resistance and, especially useful in colder climates, a non-stick characteristic.

My invention is described in terms of a left hand drive vehicle. A mirror image of the drawings and the description applies to a right hand drive vehicle and it must be well understood that my novel embodiments are not limited to left hand drive vehicles but apply fully to right hand drive vehicles.

Figure 1:
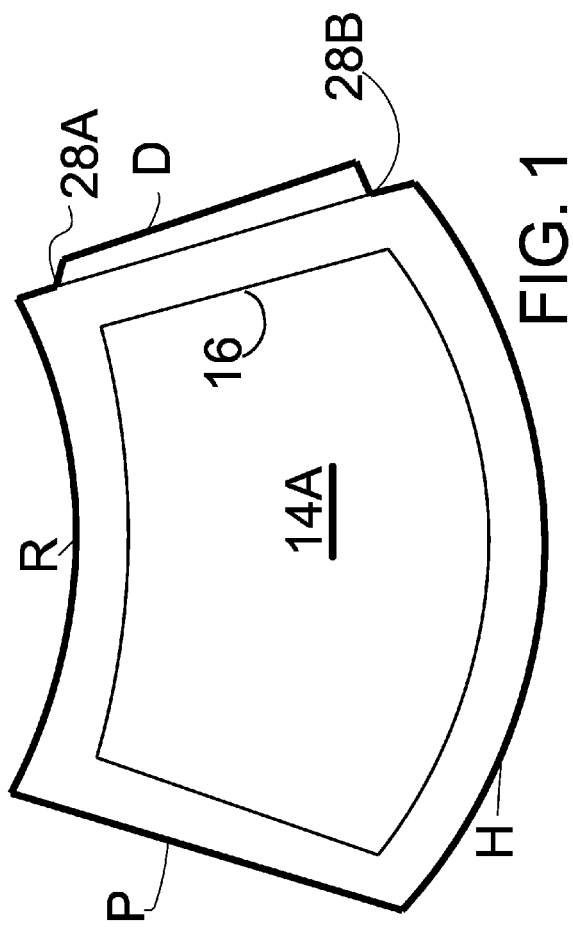
FIG. 1 shows my first preferred embodiment of the external vehicle protective windshield cover as designed for a left hand drive vehicle laid out flat.

FIG. 1 is a plan view of the first preferred embodiment of my invention of a novel, exterior, protective, cover for a vehicle windshield region. FIG. 1 shows in plan view a flexible, water proof, reflective cover 14A, with main sides R for the roof edge, P for the passenger side edge, H for the hood side edge and D for the far edge of the driver's side. The edge regions comprise a border approximately 3-cm. (1-in.) inboard from an edge. Points 28A and 28B are joined by a phantom line to show a fold line which is dimensioned to lie above the exterior side extent of the driver's A-pillar and the region between that fold line and edge D is designated a wing portion of the cover. The hidden line 16 is an outline of the glass portion the vehicle's windshield as well as the immediately adjacent area containing the parked windshield wipers sometimes called the wiper-well in some vehicles cabin air vents may also be present in that well.

The cover typically has a hem which can encapsulate a plurality of magnets, preferably permanent neodymium cylindrical magnets axially magnetized the axis being perpendicular to the plane of the cover. The cover may also be a composite such as having a flexible foam core; however, if the main cover thickness is greater than about 0.5-mm (0.02-in.) the edge region, preferably, is not self-hemmed but consists of a non-magnetic material, preferably, of thickness less than about 0.25-mm (0.01-in.) of sufficient strength to contain the magnets during many repeated on-off attachments and is used to encapsulate the plurality of magnets to the cover on the side of the cover which is to be held to the vehicle and may over wrap the edge of the main cover for functional cover durability in lieu of a hem.

FIG. 2A shows a hemmed section of cover 14A less than 0.5-mm (0.02-in.) thick in partial cross section 14 revealing the side view of an encapsulated cylindrical magnet 18. The encapsulation restrains the movement of the magnet in all directions.

Figure 2C:
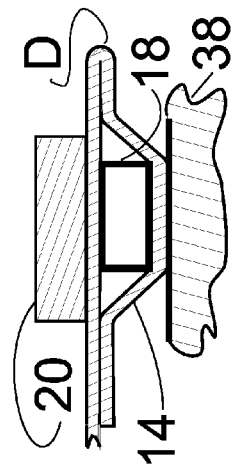
FIG. 2C shows a fragmentary cross sectional detail of a peripheral region of the external vehicle protective windshield cover magnetically attached to a vehicle wherein the external vehicle protective windshield cover has a thickness greater than the non-magnetic material securing the position of the magnet to the cover.
Figure 2B:
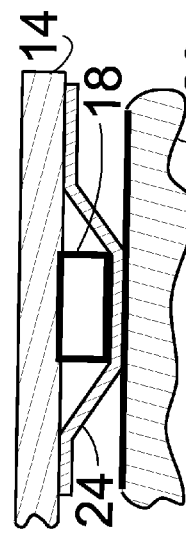
FIG. 2B shows a fragmentary cross sectional detail of a peripheral hem of the external vehicle protective windshield cover magnetically held to an A-pillar within the door closure on the driver's side of a vehicle which hem is surmounted by a compressible strip and which hem also secures the position of a shown magnet.

FIG. 2B shows a hemmed section of the wing section of cover 14A in partial cross section 14, the cover being less than about 0.5-mm (0.02-in.) thick revealing the side view of an encapsulated cylindrical magnet 18 attached by magnetic force to a portion of a vehicle, driver's side, ferromagnetic A-pillar 38 shown in cross section. The edge region of the cover attached to the driver's side A-pillar extends only partially through the door closure and is shown surmounted by a bonded compressible strip of foamed material such as is used in vehicle door gasketing 20 having a cross section of about 25-mm (1-in.) wide×about 20-mm (¾-in.) high which aids in preventing the wing from being pulled out by a thief when the door is closed over the wing. The bonded compressible strip 20 is a contributing means to theft deterrence and may be enclosed within a hem and may have individual magnets adhesively attached to a side which will be adjacent to the A-pillar.

FIG. 2C shows a hemmed section of cover 14A in partial cross section 14, the cover being greater than about 0.5-mm (0.02-in.) thick, revealing the side view of an encapsulated cylindrical magnet 18. The encapsulation of the magnet is accomplished by the addition of a nonmagnetic strip 24 of thickness less than about 0.5-mm (0.02-in.) and preferably less than 0.25-mm (0.01-in.) thick which is bonded to the main cover along its edge region and which secures the magnets in position on the side of the main cover which is attached to a ferromagnetic surface of a vehicle A-pillar, roof or hood shown in partial section 26.

Figure 2D:
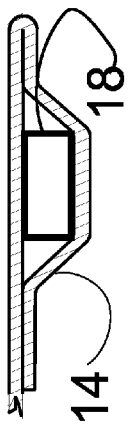
FIG. 2D shows a fragmentary cross sectional detail of a peripheral region of the external vehicle protective windshield cover which is held to a vehicle exterior by means of a magnetic tape affixed to the cover.

FIG. 2D shows a hemmed section of cover 14A in partial cross section 14 having a magnetic tape section bonded along the edge of the cover and shown adhered by magnetic force to a ferromagnetic surface of a vehicle A-pillar, roof or hood shown in partial section 26. Magnetic tape preferably follows completely the edges R, P and H to permit, when properly deployed, a smooth, wind-resistant seal to the vehicle ferromagnetic exterior. Magnetic tape, used within the door closure region, should follow along edge D for at least the end and central portions of that edge.

FIG. 3A is a plan view of a second preferred embodiment 14B of my invention of a novel, exterior, protective cover for a vehicle windshield. The material is of the same type as that of the first preferred embodiment. The configuration is similar to the first preferred embodiment except a second wing delineated by far edge P2 and a fold line shown by a phantom line with end points 28C and 28D is added to the passenger side of the cover. The driver's side wing is delineated by far edge D and a fold line shown by a phantom line with end points 28A and 28B. The four main edges of the cover are designated R for roof, P2 for the passenger side, H for the hood and D for the driver's side edge. Edge H is dimensioned to fit smoothly under or over the open rear edge of a vehicle front hood. This embodiment is attached to a vehicle by means of magnetic force or by hook or loop tape strips on at least two edge regions P2 and D.

FIG. 3B is a plan view of a modified second embodiment 14C of my invention of a novel, exterior, protective cover for a vehicle windshield. The material is of the same type as that of the first preferred embodiment. A driver's side wing is delineated by edge D and a fold line shown by a phantom line with end points 28A and 28B and a passenger's side wing is delineated by edge P2 and a fold line shown by a phantom line with end points 28C and 28D. The four main edges of the cover are designated R for roof, P2 for passenger side, H for the hood and D for driver's side. This embodiment is attached to a vehicle by means of magnetic force or hook or loop tape strips in the two, adjacent, door closure regions along edges P2 and D and by magnets or magnetic tape along the edge regions R and H when the vehicle roof or hood is ferromagnetic.

FIG. 4 shows a fragmentary, perspective view of the left front side of a left hand drive vehicle with the first preferred embodiment of my novel protective cover 14A deployed to protect the windshield and wiper-well region together delineated by hidden line 16. Cover 14A edge region H covers the rear edge strip about 5 to 12-cm. (about 2 to 4-in.) wide of the vehicle hood and a small, similar, contiguous strip of the adjacent fender. Cover 14A covers all or at least a substantial portion of the exterior extent of the passenger's side A-pillar.

Some vehicles are built with the exterior of the A-pillar covered by a windshield gasket sufficiently thick to prevent magnetic attachment; however the adjacent door exterior is an available ferromagnetic surface. In such case the custom cover is dimensioned to extend edge P about 3-cm (1.5-in.) so that edge region P can be magnetically held to the immediately adjacent, ferromagnetic, closed, passenger's door frame. Cover 14A edge region R covers a front edge strip about 5 to 12-cm. (about 2 to 4-in.) wide of the front edge of the vehicle roof. Cover 14A fold line, with end points 28A and 28B, lies closely above the exterior side edge of the driver's side A-pillar and the cover 14A wing section ending in edge D is within the driver's side door closure region. Cover 14A edge regions H, P and R are held to the underlying, exterior ferromagnetic vehicle surface by magnetic force exerted by permanent magnets attached to or within suitable edge regions of cover 14A or by magnetic tape attached to suitable exterior edge regions of cover 14A. Cover 14A wing edge region D is held to a non-gasketed region within the door closure region of the driver's side A-pillar by either magnetic force as the other edge regions or, optionally, by strips of mating hook and loop tape, one portion firmly attached to the A-pillar door closure region and the mating strip attached to a matching region along cover 14A edge region D. In situations in which a vehicle has a double row of gaskets on the A-pillar with insufficient ferromagnetic surface exposed or if the A-pillar is not ferromagnetic, it is necessary to use mating hook and loop tapes to attach the driver's side wing of my protective cover.

The disposition of magnets, magnetic tape or hook and loop tape strips along edge regions of cover 14A are not shown in the plan view Figs. because that would, I think, add confusing detail but are disclosed verbally below. The individual magnets used can be of many types such as bar or cylindrical and of many compositions; hence I will describe an array that has worked well under summer and winter conditions in the Mid-Atlantic region of the U.S.A. under conditions of usually less than about gale force winds.

The magnets used were neodymium cylindrical magnets 2-mm (5/64-in.) thick and 8-mm (5/16-in.) in diameter, axially magnetized and nickel plated, encapsulated within a hem of nonmagnetic cover material 0.229-mm (0.009-in.) thick. The magnets were rated as having a pull force of about 1.36-kg (3-lb. force) and, displaced from a vehicle ferromagnetic surface by the layers of finish and one layer of cover material, experimentally developed a holding force of about 0.5-kg (about 1-lb force). The cover edges measured about: D=81-cm (32-in.), H=165-cm (65-in.), P=97-cm (38-in.) and R=125-cm (50-in.). Magnets were placed near the two extreme corners of each edge region and, additional magnets were about equally spaced within edge regions as follows: H=4, P=6, R=4 and within edge region D, one magnet was located near each end and two were spaced equally in between. Of edges H, P, and R, edge P required the most magnets because the underlying A-pillar surface had the most curvature, and the securing of edge P to the vehicle was most important to keep my cover taut and properly deployed especially in windy weather. Alternately commercially available magnetic tape about 20-mm (0.75-in) wide was positioned about 2 to 6-mm (0.1 to ¼-in,) inboard of the peripheral edges D, H, P and R attached to the underside of cover 14A so that the tape directly contacted the finish of the ferromagnetic vehicle body.

Alternately to secure edge region D it was found satisfactory to use four, commercial, preferably nylon, hook and loop strips (attached by stitching to the underside of cover 14A with a width of about 19 to 25-mm (¾ to 1-in) and about 50 to 75-mm (2 to 3-in.) long arranged along and inboard of the D edge, one near each end and two, spaced equally, in between. Mating strips of hook and loop tape were adhesively attached to generally matching positions within the door closure region of the driver's side of the A-pillar. The above described arrangement of magnets, magnetic tape, or hook and loop tape for cover 14A peripheral attachment to a vehicle is also suitable, as appropriate, for the other embodiments of my protective covers.

FIG. 5A shows a partial cross section 14 of cover 14A greater than 0.5-mm (0.02-in.) thick revealing the side view of an cylindrical magnet 18 encapsulated by non-magnetic strip 24 less than about 0.25-mm (0.01-in.) thick, magnetically holding the cover edge region D to an internal surface of driver's side, ferromagnetic A-pillar 38 shown in fragmentary cross section. Compressible strip 20 is shown surmounting the cover 14 along edge region D in order to substantially prevent the possibility of the edge region being pulled out when the door is closed; strip 20, obviously, may be enclosed within a hem if desired.

FIG. 5B is an illustration of an alternate means of attaching the wing section of the first preferred embodiment of my novel protective cover 14A to an internal door closure surface of A-pillar 38 shown in fragmentary cross section. Along the D edge of the wing contact side shown in cross section 14 is attached a strip of commercial hook or loop tape 42, active surface facing out. Attached to an internal closure surface of driver's side, A-pillar 38 shown in fragmentary cross section is a mating section of commercial hook or loop tape 40, active surface facing out. The two strips of hook and loop tape are shown joined to hold the cover to the A-pillar. Release is accomplished by peeling one strip from the other, an operation that cannot be performed with the door closed.

FIG. 6 shows a fragmentary perspective view of a vehicle with the second preferred embodiment of my novel protective cover, 14B deployed to protect the windshield and wiper-well region together delineated by hidden line 16 and the rear of the hood 34. The cover 14B extends from the forward region of roof, 36, to underneath the rear region of the hood, 34, and from within a section of the passenger's side door, 44, closure region, the wing bounded by the line end points 28C and 28D and the hidden line P2, and to the opposite wing in the driver's side door closure region (not shown). The vehicle has a hood made of a nonmagnetic material such as an aluminum alloy and A-pillars are of any material. The wing sections are preferred to be held to their respective A-pillars by commercial, mating hook and loop, tape sections, attached to the inner surface in edge regions P2 and D of the cover, 14B and a mating section of tape attached to a generally corresponding section of the interior surface of the appropriate A-pillar. The edge region H is positioned below the rear region of the hood and preferably attached near the left and right ends of edge H by means of commercial, mating hook and loop tape sections, one tape section attached to the exterior surface of the cover, 14B, and a mating section of tape attached to a corresponding section of the under surface of the rear region of hood, 34 keeping the edge H taut and secure.

Section line 7 involves the closure region of passenger door, 44, detailed in FIG. 7. Section line 8 involves the join between the outside surface of cover, 14B, in the region near edge H to the underside of the corresponding rear region of hood, 34, detailed in FIG. 8.

FIG. 7 shows my cover, 14B, in partial cross section, 14, secured to the passenger's side A-pillar shown in partial cross section 39, using sections of mating, commercial, hook and loop tape shown in cross section as tape 42 bonded to the underside of the cover partial section, 14, and a cross section of mating tape, 41, bonded to the generally corresponding exterior surface of the door closure region of A-pillar 39 shown in partial cross section, the tape active surfaces shown at least partially mating to secure the cover, 14B, to the A-pillar 39 within the door closure region.

FIG. 8 shows my cover, 14B, in partial cross section, 14, surmounted by attached hook or loop tape, cross section, 50, which is at least partially bonded to a mating hook or loop tape, cross section, 48, which is bonded to a corresponding rear region of the underside of hood, 34, shown as partial cross section, 46.

FIG. 9 shows a first enhancement for improved deployment speed added to my first preferred embodiment of a protective cover. Shown is the same cover as described in the description of FIG. 1 with the addition of flexible, thin, rod like members, 51A and 51B, which may be strips of such materials as polyethylene or bamboo about 3-mm by 2-mm (about 0.1 by 0.08-in.) in cross section. Members 51A and 51B are mounted horizontally, crosswise to cover, 14A and begin at a point near the covered passenger's side A-pillar and extend about two thirds of the width of cover, 14A. The horizontal placement is near the bottom and near the top of the passenger's side extent of the covered glass windshield. Members, 51A and 51B are bonded to cover, 14A, at their passenger side tip region and also for about a 2.5-cm (1-in.) length near the mid-point of cover, 14A, the bonded regions of members 51A and 51B are designated approximately by points 52 and 52A and 54 and 54A, respectively.

FIG. 9 also shows a second enhancement which is an external pocket comprising a transparent, weather resistant, outer member 86 bonded to the exterior of cover 14A on three sides as indicated by hidden double lines 88 and located slightly below the middle of cover 14A and near the driver's side. The pocket formed between elements 86 and 14A is open at the top.

FIG. 9A shows the construction details of a third enhancement which is a permit pocket located in the upper central region of cover 14A. A top and two side slits were made in the selected region of cover 14A, dimensioned slightly over size of the desired pocket dimensions, forming flap 14A1. The slit edges may be taped or hemmed over if desired. From the underside of cover 14A as shown in FIG. 9A a transparent flexible weather resistant plastic cover, member 80 sized larger than flap 14A1, is located centrally over the slit opening and against the base of the slit. Member 80 is then bonded shown as hidden double lines 82 near its periphery where it contacts the underside of cover 14A. Flap 14A1 is brought up against member 80 and bonded shown as hidden double lines 83 to member 80 at the bottom and on both sides to form a pocket between elements 80 and 14A, open at the top and accessible only from the underside of cover 14A yet the contents of the pocket are readily visible from the front of the windshield. Section line 9B passes through cover 14A and member 80 and views the side of the permit pocket.

FIG. 9B shows the sectional view 9B which is a partial cross section 14 of cover 14A and a cross section of permit pocket transparent member 80 and a side view of the pocket formed by flap 14A1.

Figure 10:
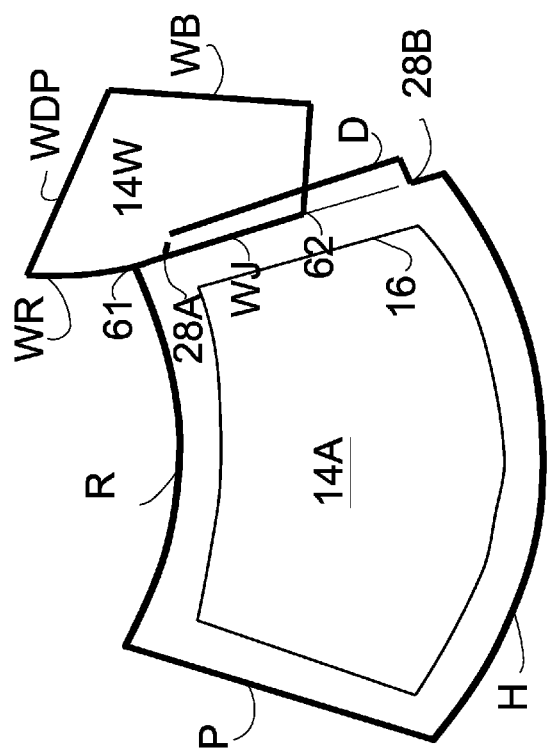
FIG. 10 is a plan view of my first preferred embodiment cover as designed for a left hand drive vehicle enhanced with an attached, external, protective cover for the adjacent driver's side window.

FIG. 10 shows a first supplement 14W added to my first embodiment cover and of generally the same type of material. Supplement 14W is a protective cover overlying at least part of a front door window and door surface. Shown is the same cover of FIG. 1 with the addition of cover 14W attached to cover 14A slightly to the passenger's side of and parallel to the fold line terminated at points 28A and 28B and extending from point 62 to point 60, labeled edge WJ. Cover 14W, has four edge regions identified as edges: WR, roof edge, WDP, door post edge, WB, window bottom edge, and WF, window front edge which are held to ferromagnetic door regions by magnetic force in the same manner as cover 14A is held to the vehicle body. It is obvious that, if desired, a mirror image of attached window cover 14W, could be added to the passenger side.

Figure 11:
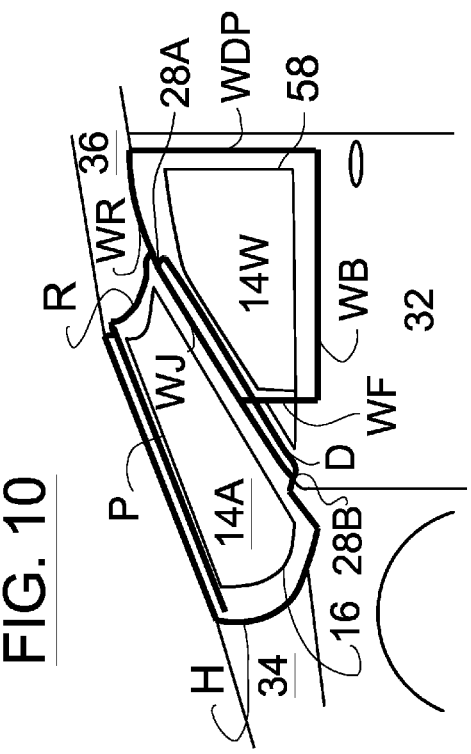
FIG. 11 shows a partial perspective of the driver's side of a left hand drive vehicle with my first preferred embodiment of the external vehicle protective windshield cover enhanced with an attached, external, protective cover for the adjacent driver's window region both covers shown in the attached position.

FIG. 11 shows a fragmentary perspective view of a left hand drive vehicle with the first preferred embodiment of my novel protective cover, 14A of FIGS. 1 and 4 deployed with first supplement window cover 14W over part of the driver's side door 32. Cover 14A is deployed to protect the windshield and wiper-well region together delineated by hidden line 16. The added supplement 14W protects the door window delineated by hidden line 58 and an upper portion of the door, 32. The driver's side wing is shown attached to the driver's side A-pillar with a hidden line for edge, D. Edge WB may be located about a 5-cm (about 2-in) below the bottom the door window glass (as shown) or it may be located somewhat lower so as to include the door handle and lock in order to protect those parts from the elements.

No provision is shown to include a side view mirror within the protective cover although that could be done. Such a provision is not shown because it requires fairly complex and expensive additional construction, and protection of a side view mirror may be provided simply and cheaply by means of a plastic bag such as a used grocery bag slipped over the mirror assembly and held with a rubber band.

For magnetic force to hold my first supplement window cover, 14W, to the ferromagnetic vehicle exterior surfaces below the edge regions WR, WDP, WB and WF, I prefer to have at least one cylindrical magnet (of the type described in FIG. 4 description) adjacent to each of the five edge intersections and one magnet in in the middle of edge regions WR and WF and at least two additional magnets equally spaced in the edge regions WDP and WB. When magnetic tape is used to attach cover 14W to door 32, preferably the tape should be bonded to the underside, near-edge region of edges WR, WDP, WB, and the bottom portion of WF.

A vehicle rear window which is immovable is covered and protected in the same manner as described above for the first or second embodiments for a vehicle windshield region with minor variations depending on the rear window body configuration. If the vehicle has a trunk opening in close proximity to the bottom of the rear window and the rear window surround is ferromagnetic, then the edge regions of the rear window cover are fitted with magnetic force means. The cover is dimensioned to extend slightly beyond the top and side extents of the rear window and the bottom edge to extend within the trunk closure region in the same manner as the windshield cover extended into but not through the driver's side door closure region as illustrated for the windshield cover as shown in FIGS. 2C, 2D, 2D If the immovable rear window sides are close to door closures, then the rear window cover design is directly analogous to the windshield cover embodiments described above. The side edges of the cover are dimensioned to fit inside but not through the door closures just as for the windshield cover. The top and bottom sides of the cover are dimensioned to overlie about 2-cm. (1-in.) of the corresponding rear window surround. Rear window cover attachment within the door closures is as described and illustrated for the windshield cover in either embodiment one or two. Such attachment can provide a taut cover; however, attachment can be enhanced by using magnetic force means as previously described to secure the bottom and top edges of the rear window cover when ferromagnetic window surrounds are present.

Figure 12A:
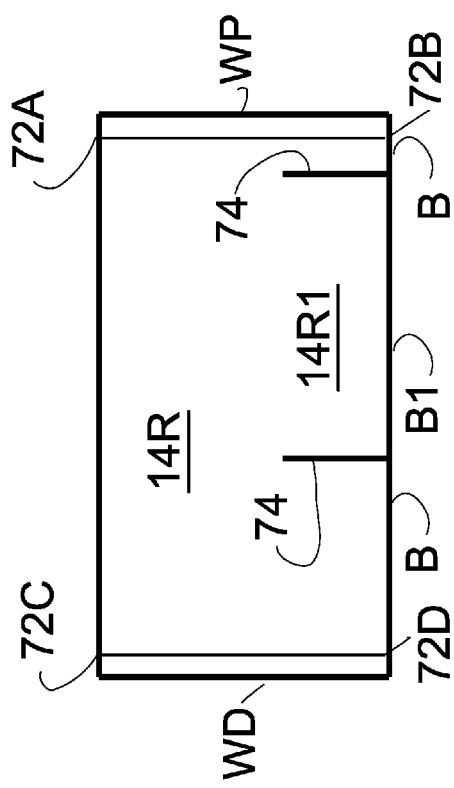
FIG. 12A is a plan view of my third preferred embodiment external, protective cover modified to function as an external, protective, cover for the rear window region of a vehicle with a rear hatch.

FIG. 12A shows a plan view of my third preferred embodiment of the external protective windshield cover as modified to function as an external protective cover 14R for at least most of the rear window region of a vehicle with a rear hatch. As shown the overall shape is modified to be closely rectangular with side wings delineated by end points 72C and 72D of the fold line shown as a phantom line and edge WD (driver's side) and by end points 72A and 72B of the fold line shown as a phantom line and edge WP (passenger's side). The wings are dimensioned to be folded on the fold lines such that the wings reach substantially into but not through the side closure regions of the hatch and can be fastened to the hatch side edge. Cover 14R has two slits 74 which form a flap region 14R1 between the slits 74. Flap region 14R1 is dimensioned to overlie by an excess extent of at least about 3-cm. (about 1-in.) the external rear window wiper apparatus. The bottom edge of flap 14R1 is designated B1 and the remaining bottom edge of cover 14R is designated B.

The slit edges of flap 14R1 may have attached near their mid length and inboard of edge B1 one end of strips of hook or loop tape of length about one third of the length of slit 74 with the active surface facing away from the surface of hatch RH. Inboard and along edges 74 of the underside of flap 14R are bonded mating strips of hook or loop tape which permit joining of flap 14R1 to 14R.

Figure 12B:
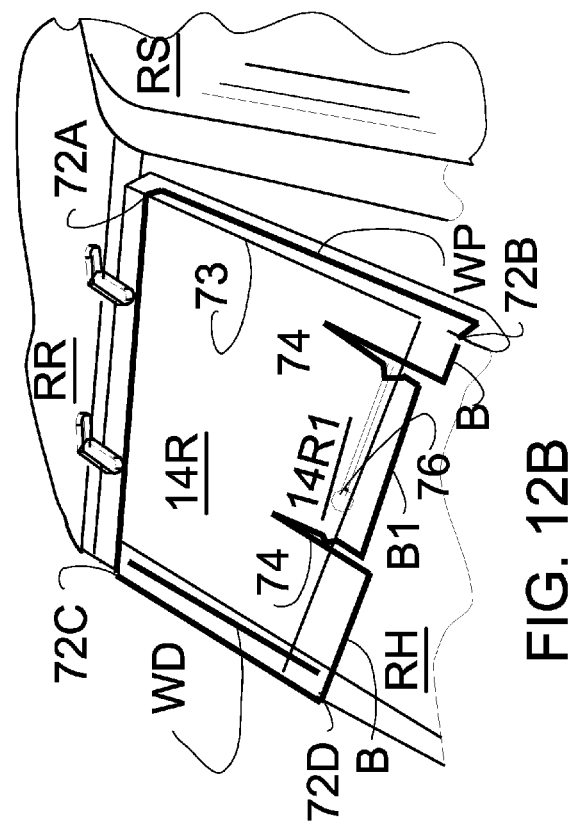
FIG. 12B shows a partial perspective from the right rear of a left hand drive vehicle with a rear hatch, partially open, showing my external, protective, cover for the rear window attached in the side closure regions of the hatch to protect at least the major portion of the rear window region.

FIG. 12B shows a fragmentary perspective view of from the right rear of a left hand drive, hatch back vehicle with the third preferred embodiment of my novel protective cover 14R attached to a partially open hatch. For simplicity, if the hatch hinges are external and are attached to the upper edge region of the rear glass as shown, then my protective cover does not need to include that region.

Shown in fragments are: vehicle rear roof section RR, vehicle rear right side RS and vehicle rear hatch RH. Modified cover 14R is shown overlying most of the rear window glass designated by the hidden line 73. Cover 14R is folded over the exterior side edges at fold line end points 72A and B and 72C and D.

Wing regions ending in edges WP and WD are attached to the underlying edge closure regions of hatch RH to provide a taut cover over most of the rear glass region of the hatch RH and a portion of the non-glass region below the window ending at cover 14R edges B.

Attachment of the cover 14R wings may be by magnetic force if there is sufficient ferromagnetic surface of the underlying, hatch closure region exposed. The magnetic force is obtained from permanent magnets encapsulated in the near-edge region along edges WD and WP of the cover 14R; encapsulation is typically as shown in FIG. 2B. Alternate attachment is by several mating pairs of hook and loop tape strips for each wing, the attachment being similar to that shown in FIG. 5B or 8. One member of a strip mating pair is bonded in the hatch edge closure region parallel to the axis of that edge to substantially mate with a member bonded to my modified protective cover 14R in the wing region and inboard along edge WP or WD.

Protective cover 14R has bottom edges B and B1 which are attached to the ferromagnetic exterior region of the rear hatch below the rear window region by magnetic force using either a plurality of individual, encapsulated permanent magnets embedded inboard from and along edges B and B1 or magnetic tape bonded inboard from and along the contact side of edges B and B1.

Operation of the Invention

First preferred embodiment reference FIGS. 1, 2A, 2B, 2C, 2D, 4, 5A & 5B, 9, 9A 10, 11.

The operation of the first preferred embodiment is best understood by referring to FIG. 4. A driver of a vehicle parked outdoors opens his door with my cover FIG. 1, 14A in hand. Placing most of the cover 14A to rest on a near portion of the vehicle windshield region, the driver easily arranges the wing edge D and the hold downs, as detailed in FIG. 2B, 2C, 5A or 5B, in the A-pillar door closure with point 28A about 3-cm (about 1-in.) to the rear of the front roof edge. It is useful if the cover has external markings indicating the upper and lower, driver-side end-points of the windshield to provide ready reference points for installation.

The driver then sets the driver's side ends of edges R and H, as detailed in FIG. 2A, 2C, or 2D so cover 14A is smoothly mounted. The driver closes and locks his door which secures the wing region with edge D compressed within the door closure strongly resisting pull out before tearing thus deterring theft. The remainder of the cover is then pushed over the windshield in the direction of the passenger side.

The driver goes to the passenger side, takes hold of a near-by portion of cover 14A and deploys cover 14A as shown in FIG. 4 to provide a smooth, taut fit over the windshield and wiper well. Cover 14A is held securely to the ferromagnetic body parts by magnetic force along edges H, P and R. There is no need to open the passenger side door. Deployment is completed quickly and simply. Inexperienced operators were able to deploy prototype covers in less than one minute.

As shown in FIG. 9, when a first enhancement of two flexible strips 51A and 51B are provided, rather than: "The remainder of the cover is pushed over the windshield in the direction of the passenger side." The driver is able to hold the near, free end of each of the strips and by that means to deploy the cover 14A to an almost finished position. After gaining the passenger's side of the vehicle, it requires a minimum of time to complete deployment as described above. This first enhancement can also be used to enhance the other embodiments of my protective covers.

During the time cover 14A is deployed, the windshield and wiper-well region are protected from frost, sleet or snow in cool weather. In sunny weather the wiper-well and the windshield interior regions are protected from the heating and damaging effects of most of the sun's rays.

Because the wing region with edge D is tightly secured within the door closure region, a thief is unable to remove the full cover 14A, FIG. 1 To steal the readily removable portion the thief would have to cut cover 14A more or less along the fold line with end points 28A and 28B. Because means to secure the cut edge is lacking, the cut and stolen portion will not stay deployed on a windy day since a wind will develop sufficient pressure under the cover to release some or all of the holding magnets preventing protection from the elements; hence, the stolen portion has no utility and only minimal value which is an effective theft deterrent.

A reverse of the deployment operation is used to remove cover 14A which may be covered with frost, ice or snow. The driver may first wish to brush at least some deep snow from the hood 34, cover 14A, and roof 36 of FIG. 4 before beginning removal of cover 14A. Removal is usually best started at the FIG. 4 passenger side roof edge corner with the passenger's side magnetic attachment being broken manually and the loosed section tossed toward the driver's side end of edge H. The driver then goes to his door, finishes removal of cover from the exterior regions and may shake the exterior regions to clear surfaces. If the window cover FIG. 11 14W, discussed later, was employed and extended down to cover the door handle, it may be useful to manually lift a portion of cover 14W along edges WPD and WB and move cover 14W aside.

With the cover draped loosely over the front of the driver's door and part of the fender, the driver unlocks his door and opens it. The driver then manually frees the edge D wing region from the A-pillar. Cover 14A, perhaps after another shake or two, is then secured. Similar procedure is used to remove a rear window or a rear hatch cover.

There are enhancements to cover 14A. As also shown in FIG. 9, a second enhancement provides a "see through" pocket, between member 86 and the underlying portion of cover 14A, for receipt of items such as parking violations notices. Although such notices can be placed as usual under windshield wipers by lifting up the cover near the center of the hood, some authorities require a ready means for a reasonably secure delivery of such notices which pocket 86 provides. Without the pocket my external, protective cover might well be illegal for use on an "on the street" parked vehicle in some jurisdictions. This second enhancement can also be used to enhance the other embodiments of my windshield protective cover.

FIG. 9A shows a third enhancement which provides a weather protected "see through" pocket, the space between member 80 and flap 14A1, for such items as parking permits if they must be displayed to be seen through windshields of vehicles which are parked outdoors in special places. To use the pocket behind transparent member 80, prior to deployment of the cover 14A a desired permit or notice is first inserted through the top, opening of the pocket, proper side facing out. Deployment of the cover then proceeds normally. The permit is retained, under the top, central region of cover 14A and yet in full view from the front of the vehicle. This third enhancement can also be used to enhance other embodiments of my protective cover. More but far from complete theft protection for any item in the permit pocket under member 80 is provided when each side of my cover is secured within door closures.

As shown in FIGS. 10 and 11 a supplement, protective cover 14W for a vehicle front side window may be provided. In operation, after the wing edge D region has been attached and the door closed and locked then supplement cover 14W is brought down over the door window and the edge regions manually smoothed for a taut fit before continuing to deploy the remainder of cover 14A as described previously. If a mirror image shaped cover to 14W is attached symmetrically along line P, then the mirror image cover would be deployed over the passenger's side window and smoothed after edge P was arranged properly and smoothed.

My first preferred embodiment of my novel vehicle windshield protective cover 14A has certain limitations of operation. This embodiment will not function on a vehicle with hood, roof or A-pillar made from non-ferromagnetic materials or covered with more than about a 2-mm (about 0.1-in.) thickness of non-ferromagnetic materials. Magnetic force attachment is not suitable for use in regions where there is airborne gritty, ferromagnetic material since such material will be attracted to and held to the magnetic force fields of the cover. Wind speeding over a deployed cover such as 14A of FIG. 4 passes over the windshield shape which can act as an airfoil producing varying pressures under the cover. As a result of the varying pressures, the edges of the deployed cover may experience forces which may tend to shift the locations of the hold down spots under magnets. Whereas the magnets will resist a pull-away force comparatively strongly there is a lesser resistance to sliding movement particularly over a waxed surface. Sliding movement when gritty material is caught between the cover and a vehicles finish has a tendency to scratch or abrade the finish on which the cover is deployed. Damage to a vehicle's exterior finish is very undesirable. My second embodiment disclosed below uses hook and loop fastening within the door closure regions and without magnets along the roof edge and the hood edge is suitable for such environments.

A marked advantage of my novel, external, vehicle, windshield protective cover is that to deploy cover 14A is fast and easy. When leaving a parked vehicle a driver exits with my cover 14A in hand. In less than 15-seconds the D edge and nearest corners can be put in place. The driver then closes and locks his door which is a normal, usual action. In less than 40-seconds the driver then walks to the passenger side of his vehicle and finishes deployment of my cover 14A so that it is smooth and taut over his windshield region held by magnetic force to the exterior of the A-pillar. The operations needed for complete deployment of my cover 14A require less than 60-seconds. A like operation can be used to deploy my novel cover over an immovable rear window but involves opening at least one door of a vehicle having four or more doors.

To deploy my first embodiment windshield region cover it is not necessary to reenter or lean into the vehicle; it is not necessary to open a second door and reenter or lean into the passenger compartment. With the use of the flexible strips 51A and 51B shown in FIG. 9 the deployment time can be reduced. With experience, an operator may be able to satisfactorily deploy cover 14A entirely from the driver's side when using strips 51A and 51B with no need to visit the passenger side of his vehicle.

Another advantage of my cover 14A, with or without enhancement window covers such as 14W, is that, as discussed above, my cover wing with edge D FIG. 4 is secured within the closure of a locked door and strongly resists pull out by a potential thief. If the thief cuts my cover loose, perhaps along the line with end points 28A and 28B FIG. 4, the thief will have a cover segment that is not functional and thus has no appreciable value. As with any external cover, vandalism cannot be specifically prevented.

Further advantage accrues to my novel, external cover 14A when the enhancement pockets formed under transparent members 86 of FIGS. 9 and 80 of FIG. 9A are incorporated. These pockets permit the benefits of the cover to be used on vehicles while parked on public streets and in special parking areas where they might not otherwise be allowed. These pockets may be incorporated into any of my cover embodiments.

The Second Preferred Embodiment Reference FIGS. 3A, 4, 5B, 6, 7 and 8.

My second preferred embodiment, FIGS. 3A and 3B, provides a novel solution to overcome the limitations of the first preferred embodiment and provides a protective cover that is almost as simple, quick and easy to deploy and recover as the first embodiment. The second embodiment is effective for those vehicles with a non-ferromagnetic hood and also an A-pillar that is not ferromagnetic, or is ferromagnetic but is substantially covered with non-magnetic material such as gaskets of a thickness over about 0.5-mm (0.04-in.) in the region adjacent to the windshield. The second preferred embodiment may be preferred by users in and of itself, particularly those in climates where there are very strong, gusty winds.

The operation of the second preferred embodiment is best understood by first referring to FIG. 4 and finally to FIG. 6. A driver of a vehicle parked outdoors opens his door with my cover either FIG. 3A, 14B or FIG. 3B, 14C in hand. Operation for both covers is illustrated using cover 14B. Placing most of the cover 14B on a near portion of the vehicle windshield region, the driver easily arranges the wing edge D as detailed in FIG. 5B in the A-pillar door closure with point 28A about 8-cm (about 3-in.) to the rear of the front roof edge and presses the mating hook and loop tape strips together so that wing edge D region of cover 14B is smoothly mounted. Marking the upper and lower end points of the windshield on the exterior of the cover can orient the operator and speed deployment.

The near end of the region near edge H is slipped under the rear edge of the hood. As detailed in FIG. 8 the cover, exterior surface mounted, hook or loop tape 50 is pressed to mate with the mating section 48 already attached to the underside of the hood. The remainder of the cover is pushed over the windshield in the direction of the passenger side.

The driver then closes and locks his door which secures wing region with edge D and deters theft. The driver then goes to the passenger side, opens the passenger side door, and takes hold of a section of cover and arranges cover 14B to arrive at the condition shown in FIG. 6 but with the passenger door open. Cover wing edge P2 is arranged to provide a smooth, taut fit over the windshield and the mating hook and loop tapes are pressed into engagement as shown in FIG. 7.

It is preferred to make sure that the edge R near point 28C is as taut as possible; some slack is permitted lower down. The passenger door is then closed and locked further securing my protective cover. The last operation is to make sure edge H is fully under the rear edge of the hood and the near corner of edge H region hook or loop strip is pressed to engage the mating strip on the underside of the hood resulting in a deployed cover 14B as shown in FIG. 6.

The overall cover deployment operation is fast and easy. There is no need to enter the vehicle nor to bend over or lean into the interior to fasten straps. If the environment has ferromagnetic grit, then it is desirable to omit magnets entirely and use only the above described hook and loop fasteners. Otherwise, as in embodiment one and if the roof and hood are ferromagnetic, magnets may be used to secure my cover to the exterior of the rood and hood edge regions.

During the time my external protective cover FIG. 6, 14B is deployed the windshield and wiper-well region is protected from frost, sleet or snow in cool weather. In sunny weather the wiper-well, the windshield and its projected interior region are protected from the damaging effects of most of the sun's rays.

Because both wing regions with edges D and P2 are tightly secured by hook and loop strip bonding within the door closure region, a thief is unable to remove the full cover 14B FIG. 3A without opening both locked doors. The hook and loop bonded strips are only readily released by peeling one from the other; an operation that requires that the doors to be opened first. Use of hook and loop tape to secure the cover permits protection of the covered region even in above gale force winds.

A reverse of the deployment operation is used to remove cover 14B FIG. 6 which may be covered with frost, ice or snow. The driver may first wish to brush at least some deep snow or ice from the hood 34, cover 14B, and roof 36 of FIG. 6 before beginning cover removal. After the passenger door is unlocked and opened, and the edge P2 peeled from the A-pillar removal is usually best continued at the R-P2 edge corner with the cover edge P2 being tossed toward the far end of edge H. If used, the passenger side corner of edge region H is then peeled loose and a loosened section of cover 14B lifted and tossed toward and over the driver's side of the windshield.

The driver goes to his door and after peeling loose the near corner of cover region near edge H, if used, finishes removal of cover 14B from the exterior regions and may shake the cover to clear surfaces. With the cover draped loosely over the front of the driver's door and part of the fender, the driver unlocks his door and opens it. The driver then manually peels the edge D wing region loose from the A-pillar door closure region. Cover 14B, perhaps after another shake or two, may be put into the vehicle or trunk or a container for the cover. Removal of cover 14C is closely analogous to that of cover 14B.

When the rear window is immovable in the body the operation of my rear window cover is much the same as for my windshield cover disclosed above. When my cover is secured in one or two of the adjacent door closures, operation of the rear window cover directly parallels that of my windshield cover and further discussion does not seem to be required.

When the trunk closure design is used, the trunk is opened partially and the operator with cover in hand affixes one side and adjacent roof region to the vehicle, throwing the remainder to the far side of the vehicle. The bottom edge is then introduced and affixed in the near side of the trunk closure. The operator then goes to the other side of the vehicle, affixes and makes taut the remaining edges ending with the near side trunk closure. The operator then closes the trunk and, if necessary, locks the trunk to secure the cover.

Thus the rear window is protected from frost, sleet and snow in cold weather and in warmer weather the interior is protected from exposure to the sun's rays reducing fading and internal heating.

Removal of the trunk closure rear window cover is best begun from a top side after brushing away any significant accumulation of snow from the covered region and trunk top. The top edge is brought down to the trunk then partially returned if snow or sleet is in a pile on the trunk. After any piled snow or sleet is brushed off, the trunk is opened and the bottom edge region of the cover is loosened and removed, shaken if needed, and stowed.

When the rear window is in a rear hatch, the operation of the cover of my third preferred embodiment is best understood by first referring to FIG. 12B. A rear hatch is partially opened and an operator at the passenger's side with much of my cover 14A over his shoulder and with edge WP region in hand arranges edge WP region smoothly along the passenger's side edge of the hatch engaging the mating preplaced hook or loop tape strips or encapsulated cover magnets. The rest of the cover, folding along the exterior edge of the hatch at cover 14R points 72A and 72B, is then passed over the exterior of the hatch as the operator walks to the driver's side. Magnets encapsulated slightly inboard of edges B and B1 will tend to engage the ferromagnetic portion of the hatch below the window region 73. At the driver's side of the hatch the operator pulls cover 14R taut over the hatch first at the top fold point 72C of edge WD region and securing the region by engaging the mating hook or loop tape preplaced in the driver's closure edge of the hatch with tape bonded to the cover or encapsulated cover magnets. The operator then works downward smoothing and the edge WD region to secure a taut cover down to fold point 72D. The operator then walks back toward the passenger's side smoothing the bottom region B of cover 14R with its encapsulated magnets against the exterior of the hatch. Cover flap 14R1 is arranged as neatly as possible over the rear window wiper 76 using the magnets encapsulated slightly inboard of edge B1 to secure edge B1 to the underlying hatch ferromagnetic exterior. If hook and loop straps are attached along slits 74, they may be mated to further secure flap 14R1 to cover body 14R.

Should the hatch exterior be of a non-ferromagnetic material such as aluminum alloy, then magnets would not be used. In that case the lower edge region of flap 14R1 as well as its mid region must be joined to corresponding regions of cover 14R using preplaced hook and loop tape to maintain a taut cover.

The deployed protective hatch cover 14R then looks generally as is shown in FIG. 12B. When the hatch is closed and locked, my protective cover is secure and theft is deterred.

Removal of the cover is easy. An operator partially opens the protected hatch. The operator peels edge WD region free and gripping cover 14R near point 72C walks to the passenger side folding the cover downwards while at the same time disengaging the encapsulated magnets along edge regions B and B1. If needed, the partially removed cover can be shaken to free it of adhering matter before gathering the free portion of the cover and peeling edge region WP from the hatch edge completing the removal of cover 14R.

When cover 14R is deployed, most if not all of the rear window glass 73 and wiper 76 are below my protective cover and are protected from frost, snow or sleet. Most of the sun's rays will be reflected from my deployed cover reducing the heat load entering the vehicle and reducing fading and deterioration.

Because my novel cover is specifically dimensioned for a given vehicle body style it can be manufactured with specific means of attachment from the alternatives given herein to provide a superior cover than the one size fits all or a large, medium and small size of the current art. Knowing the body style to which my novel cover is designed provides an improved basis for using the exterior of the cover for a specific message that can enhance the merchantability of my cover.

What is claimed is:

1. An external, substantially weather resistant, reflective, flexible, cover for a windshield region and, if present, an associated windshield wiper mechanism and air vent well-region, of a vehicle having a body, a hood, doors, a trunk or a rear hatch, and having a windshield and associated wiper-well regions and having specific dimensions for said regions, said cover overlaying said windshield and, if present, wiper-well region and, said cover having four main sides: top, bottom, driver's and passenger's and each of said sides having an ending border region and edge and said cover having an exterior surface and an undersurface and said cover being composed of one or more materials in forms of films, fabric, threads and deposits in a generally planar configuration and comprising:
   a. said driver's side border dimensioned so as to extend into but not through the driver's side door closure and means for being removably affixed therein;
   b. said passenger's side border dimensioned so as to extend substantially over at least part of the passenger's side A-pillar exterior and not through the passenger's side door closure region and means for being removably affixed to said vehicle.
   c. said top and bottom borders being dimensioned so as to be extendable over a small bordering region of said roof and said hood respectively.

2. The cover of claim 1 with said driver's and passenger's side edge regions having permanently attached to said undersurface or within said driver's and passenger's edge regions one or more magnetic force sources to removably affix said driver's and passenger's side edge regions to corresponding ferromagnetic A-pillar surfaces within the corresponding closure regions with a predetermined holding force thereby preventing said affixed cover from being displaced by air currents resulting from the closing of a corresponding door of the otherwise closed vehicle.

3. The cover of claim 1 each edge region having permanently attached to said cover underside or within said edge region one or more magnetic force sources to removably affix said edge regions to a corresponding ferromagnetic vehicle body part; said bottom edge region being capable of being removably affixed to the exterior rear region of said vehicle hood and said top edge region being capable of being removably affixed to the forward, exterior region of said vehicle roof, said passenger's side edge region being capable of being removably affixed to the passenger's side A-pillar or adjacent, closed, door frame, and said driver's side edge region being capable of being removably affixed to the adjacent door closure region of said driver's side A-pillar and said driver's side edge region having a strip of compressible gasketing material placed opposite said vehicle contacting side of said magnetic force sources, said gasketing material having a predetermined thickness to firmly secure said driver's side edge region within the door closure preventing pull out of said driver's side cover border region thereby providing theft deterrence when the driver's side door is closed and locked.

4. The cover of claim 1 whose method of attachment within said driver's side and said passenger's side door closure A-pillars is by means comprising at least one segment of hook or loop tape permanently attached to the underside of each of said cover edge regions and at least one mating segment of hook or loop tape attached to substantially corresponding interior regions of the door A-pillars such that the hook and loop tapes on said cover edges may be removably mated to secure said cover to said A-pillars within the door closure regions thereby providing a taut, protective cover over said windshield of said vehicle.

5. The cover of claim 1 whose method of attachment within said driver's side and said passenger's side door closure A-pillars is by means comprising at least one segment of hook or loop tape permanently attached to the underside of each of said cover edge regions and at least one mating segment of hook or loop tape attached to substantially corresponding interior regions of the door A-pillars such that the hook and loop tapes on said cover edges may be removably mated to secure said cover to said A-pillars within the door closure regions and the top and bottom edge regions of said cover having permanently attached to or within said edge regions one or more magnetic force sources to removably affix said edge regions to the vehicle body: said bottom edge being capable of removable attachment to the exterior rear of the vehicle hood and said top edge being capable of removable attachment to the forward, exterior region of the roof thereby providing a taut, theft deterrent cover substantially over the windshield and wiper well region.

6. The cover of claim 1 being attached to the interior door closure A-pillars by means of at least one segment of hook or loop tape being permanently attached to the underside of said driver's and passenger's side edge region and at least one mating segment of hook or loop tape being attached to substantially corresponding interior regions of said respective door A-pillars and said cover having a further method of attachment by means of at least two segments of hook or loop tape permanently attached to the exterior surface of said cover near a corner region of said bottom edge of said cover and two mating segments of hook and loop tape bonded to substantially corresponding positions on the underside of the rear edge region of said hood of said vehicle, with said bottom edge region of said cover fitting under said hood rear region.

7. The cover of claim 1 at least the driver's and passenger's side edge region having permanently attached within at least said driver's and passenger's edge regions one or more permanent magnets as magnetic force sources to removably affix at least said driver's and passenger's edge regions to a corresponding ferromagnetic vehicle body part and having as an integral part of said cover a non-magnetic covering over the vehicle-contacting-face of all said permanent magnets, said non-magnetic covering having a thickness of about 1-mm (0.04-inch) or less and along said driver's side edge region having a theft deterring, compressible, gasket-like material of sufficient bulk to prevent said cover being pulled out when the driver's side door is closed, said gasket-like material being opposite said vehicle-contacting-faces of said magnets.

8. The cover of claim 1 at least the driver's and passenger's side edge region having permanently attached within at least said driver's and passenger's edge regions one or more permanent magnets as magnetic force sources to removably affix at least said driver's and passenger's edge regions to a corresponding ferromagnetic vehicle body part and having as an integral part of said cover a non-magnetic covering over the vehicle-contacting-face of all said permanent magnets, said non-magnetic covering having a thickness less than about 0.25-mm (0.01-inch) thick, and along said driver's side edge region having a theft deterring, compressible, gasket-like material of sufficient bulk to prevent said cover being pulled out when the driver's side door is closed, said gasket-like material being opposite said vehicle-contacting-faces of said magnets.

9. The cover of claim 1 having mounted to said exterior surface of said cover two thin rods of length about two thirds to three quarters of the horizontal extent of said windshield, said rods being mounted generally parallel to a bottom edge of said covered windshield, one of said rods about 2 centimeters (1 inch) above the covered bottom edge of said windshield and said second rod about the same distance below the covered top edge of the windshield, one end of each of said rods being permanently mounted adjacent to the passenger side edge of said covered windshield and at least one other permanent mounting point for each of said rods being near the horizontal mid-point of said cover such that the free end of each of said rods may be employed to more quickly deploy said cover.

10. The cover of claim 1 with at least one additional panel of a material similar to said cover, said additional panel having an exterior and an under surface and having front, bottom and rear edge regions and a partially free, extended top edge region, said additional panel being attached to the exterior of said cover generally along the windshield edge of a covered A-pillar and being in extent sufficient to cover at least most of an associated driver's or passenger's side window in a door of ferromagnetic material and at least a bordering bottom and rear edge of said associated door, said panel cover having either permanently attached to said inner surface of or incorporated within said bottom, rear and extended top edge regions sources of magnetic force providing a magnetic force to removably affix said panel to said door when said door is closed and to affix said extended top edge region to a corresponding part of said roof of said vehicle.

11. An external, substantially weather resistant, reflective, flexible cover for a rear window of a vehicle and, if present, an associated wiper mechanism and an overall, surrounding, border region, said cover being mostly planar, being composed of one or more materials in one or more layers and having four main sides and edges and edge regions: top, bottom, driver's and passenger's, and having an exterior and under surface and said rear window being in an immoveable portion of a ferromagnetic body of said vehicle and said cover compromising:
   a. said driver's side edge, top side edge, and bottom side edge and passenger's side edge being dimensioned to extend over said rear window and over at least a strip of a metallic surround of said rear window and
   b. at least one of said edge regions being dimensioned to reach into but not through a near closure region such as a door closure or a trunk closure;
   c. each of said four edges of said cover having either permanently attached to said under surface of said four edge regions magnetic tape or incorporated within said four edge regions a plurality of permanent magnets, providing a magnetic force to removably affix said rear window cover to said vehicle, and
   d. not more than three of said side edge regions said rear window cover being removably affixable to the exterior body of said vehicle and on at least one side region being removably affixable within at least one said near closure region, and
   e. having at least one said side edge region dimensioned to reach into said near closure region having permanently attached to the exterior of or incorporated within said dimensioned side edge region on the exterior side of said magnetic material a strip of compressible gasket-type material of predetermined thickness to firmly secure said at least one dimensioned side edge within said near closure region thereby providing theft deterrence said near closure region having received its closure element and been locked.

12. An external, substantially weather resistant, reflective, flexible cover for a rear window of a vehicle and, if present, an associated wiper mechanism and when present a surrounding, metallic border region, said cover being mostly planar, being composed of one or more materials in one or more layers and having four main sides and edges and edge regions: top, bottom, driver's and passenger's, and having an exterior and under surface, said rear window being in an moveable, ferromagnetic rear hatch of said vehicle and said cover compromising:
   a. said driver's side edge and edge region, top side edge and edge region, and bottom side edge region being dimensioned to extend over the external surround of said rear window and wiper where said surround is present, and said passenger's side border and edge extending into but not through the passenger's side closure such that the passenger's side edge can lie well within said passenger's side closure region;
   b. each of the edge regions of said cover which are dimensioned to overlie said external surround if present and the passenger's side edge having either permanently attached to the inner surface of said edge regions magnetic tape or incorporated within an edge region hem of each of said overlying edge regions a plurality of permanent magnets, providing a magnetic force to removably affix said rear window cover to said ferromagnetic regions of said vehicle and
   c. having permanently attached to the exterior of said passenger's side edge or incorporated within said passenger's side edge hem on the non-attaching side of said magnetic material a strip of predetermined thickness of compressible gasketing-type material such as to firmly secure said passenger's side edge within said closure thereby providing theft deterrence and a taut cover when said moveable portion of said vehicle is closed and locked.

13. A rear window cover of claim 12 for use when said hatch is made from a material which is not ferromagnetic and thus magnets cannot provide an affixing force comprising:
   a. said driver's side edge and edge region, said top side edge and edge region, said bottom side edge region and said passenger's side edge region each being dimensioned to extend over the external surround of said rear window and wiper where said surround is present, and both said driver's side edge region and said passenger's side edge region being dimensioned to extend into but not through their respective side closure regions such that each said edge region can lie well within their respective side closure region and;

b. the under surface of the driver's side edge region and the underside of the passenger's side region of said cover having permanently attached at least one strip of hook or loop tape, active surface exposed, and c. the driver's side and passenger's side closure region of said hatch that can be overlain by said cover edge regions each of said closure regions having at least one strip of mating hook or loop tape attached to said closure regions, active surface exposed, and being located such that said tape strips substantially can join with said cover mounted tape strips thereby securing said cover in a taut condition over said rear window, and providing theft deterrence when said vehicle hatch is closed and locked.

* * * * *